Jan. 15, 1946.　　　　P. D. FRIDAY　　　　2,393,099
PACKING BOX AND TRAYS
Filed May 25, 1942
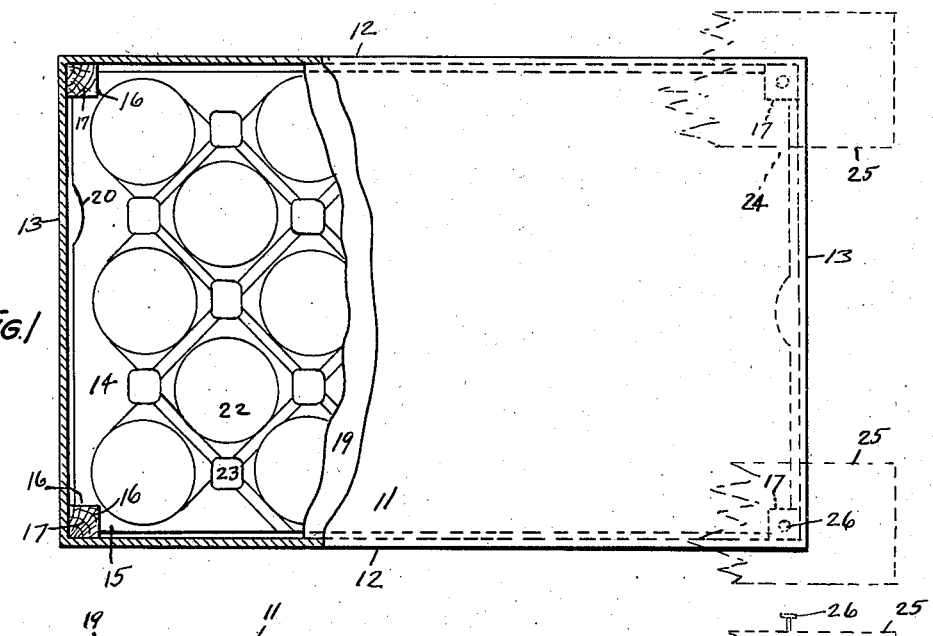
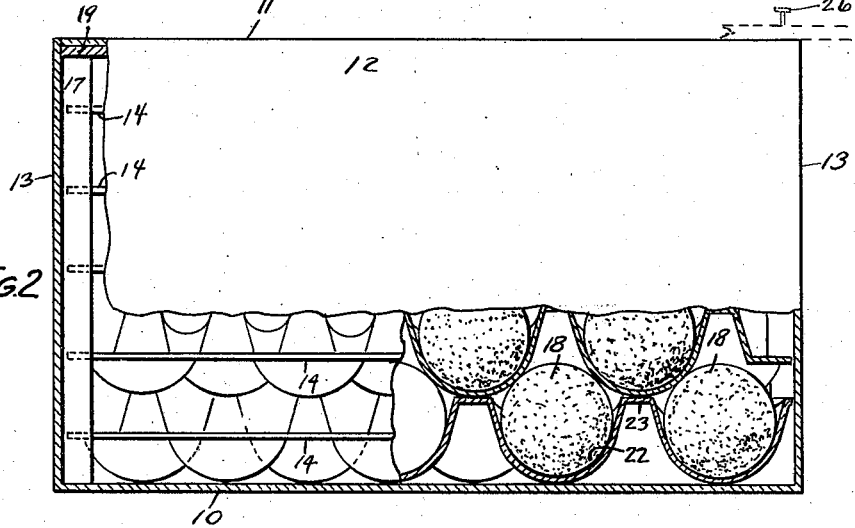
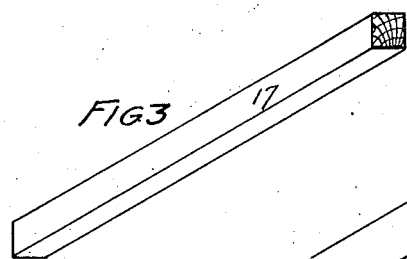
INVENTOR
PAUL D. FRIDAY
BY
ATTORNEY.

Patented Jan. 15, 1946

2,393,099

UNITED STATES PATENT OFFICE 2,393,099

PACKING BOX AND TRAYS

Paul D. Friday, Portland, Oreg.

Application May 25, 1942, Serial No. 444,342

1 Claim. (Cl. 217—26)

This invention relates generally to the fruit industry and particularly to a packing box and trays for packing fruit and other delicate or fragile objects.

The main object of this invention is to construct an inexpensive, simple, and efficient form of box and tray of the type illustrated in my copending application, Ser. No. 405,013 which has matured into Patent No. 2,351,754.

The second object is to construct a corrugated paper box with wooden reinforcements for the corners to enable the box to withstand a great load and to prevent the corners thereof from collapsing thereunder.

The third object is to construct a carton or box for handling fruit which will lower the freight rates thereon as well as reduce first cost of the container approximately one-half.

I accomplish these and other objects in the manner set forth in the following specification as illustrated in the accompanying drawing, in which:

Fig. 1 is a plan of the container with a portion of the cover cut away to disclose the contents.

Fig. 2 is a side elevation of a container with a portion of the side cut away to disclose the contents.

Fig. 3 is a perspective detail of one of the square supporting posts.

Fig. 4 is a perspective detail of a modified form of supporting post.

Similar numerals refer to similar parts throughout the several views.

Referring in detail to the drawing, there is shown the ordinary form of corrugated cardboard container consisting of a bottom 10, a top 11, and side walls 12, and the end walls 13. In the box are packed the trays 14 which are similar to the trays described in my co-pending application above identified, except that the corners 15 are cut away along the lines 16 to provide space for the wooden posts 17 which may either be square or three cornered as shown in Figs. 3 and 4.

The trays 14 are filled with fruit 18 and the uppermost tray 14 is preferably covered with a liner 19 before the top 11 is closed into place. It is desirable to provide a finger notch 20 at each end of the trays 14 to facilitate the removal of the trays.

It can be seen from the foregoing that the corner posts 17 require no fastening but are slipped into place after the trays are installed, thereby eliminating the labor and expense of fastening as well as facilitating the final collapse of the box should that be desired.

It will be noted in Fig. 4 that the post 21 is triangular in cross section instead of square, the purpose of which is to avoid cutting into the corners of the tray and preventing the sharp wooden corners from harming the nearest pieces of fruit 18. When the triangular pieces are used, the square corners are not cut out of the trays, but the corners 15 are merely cut off diagonally to receive the posts 21.

While I have illustrated the special form of tray dislosed in my prior application in which the plane surface of the tray is between the uppermost and lowermost portion of the tray, and in which the fruit containing pockets 22 rest upon projections 23 of the next lower tray, it is obvious that the same principle herein employed could be used with other types of trays without departing from the spirit of this invention.

In some instances where the boxes are apt to be subjected to moisture, it may be found desirable to insert reinforcements in the box corners to distribute the load over greater areas of the top 11 and bottom 12 as indicated by the dotted line 24 in Fig. 1, this in addition to the liner 19.

While the posts 17 or 21 are ordinarily inserted loosely, they may in some instances be secured in place, thereby still further increasing the vertical strength of the box.

One advantage arising from the construction above outlined becomes apparent in the rail transportation of fruit. Ordinarily the fruit boxes are spaced laterally and laths 25 are placed horizontally between the boxes and nailed thereto to prevent shifting in the car. With the use of my corner posts, the nails 26 are driven into the posts themselves, thereby preventing shifting and at the same time still better distributing the load over a greater portion of the box.

Another advantage arises from the fact that the corner posts protect the corner surfaces against blows which might otherwise distort the corners and detract from the natural strength thereof, and that the cut out corners in the trays themselves hold the posts rigid, greatly increasing the strength of the posts themselves.

A further advantage arises from the fact that the cut out corners in the trays which hold the posts in position in conjunction with the paper shipping container itself permits a considerable reduction of water proofing of the trays and containers which is ordinarily necessary to protect same from the moisture condition present in cold storage or in transit, thereby reducing the cost, and assures a vertical alinement of the trays when the trays are used in crates having the sides, ends, top and bottom slatted.

While reference has been made to the use of corrugated boxes it must be understood that the invention applies to any form of container whether it be solid, fiberboard, or any paper container, or slatted crates whose side walls are insufficient to confine the trays in their desired relationship.

I claim:

The combination of a plurality of superimposed corrugated boxes, wooden posts set within the corners of the each box extending the full height thereof, the trays adapted to loosely accupy said box having the corners thereof cut away to provide clearance space for said posts, said posts serving as guides for said tray to hold same in register, and laths horizontally disposed along the tops of said boxes secured to said posts.

PAUL D. FRIDAY.